Figure 1:
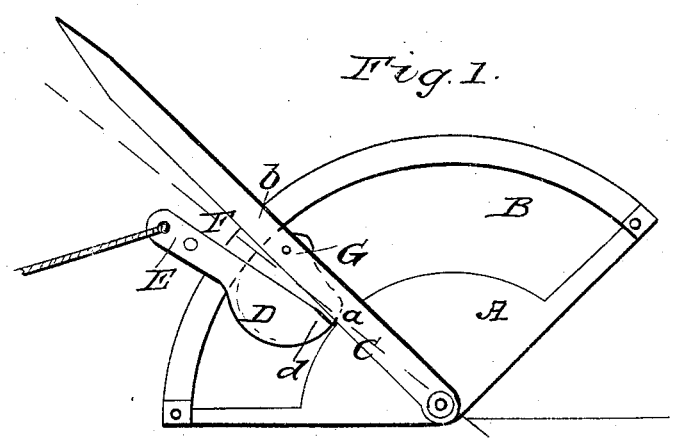
Figure 2:
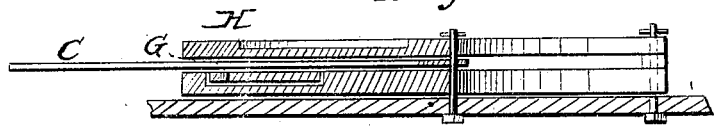

J. HOKE.
Wagon Brake.

No. 87,847. Patented March 16, 1869.

Witnesses

Inventor
J. Hoke.

J. HOKE, OF CORDOVA, ILLINOIS.

Letters Patent No. 87,847, dated March 16, 1869.

IMPROVEMENT IN WAGON-BRAKES.

The Schedule referred to in these Letters Patent and making part of the same.

*To all whom it may concern:*

Be it known that I, J. HOKE, of Cordova, in the county of Rock Island, and State of Illinois, have invented a new and improved Lock for Wagon-Brakes; and I do hereby declare that the following is a full, clear, and exact description thereof, which will enable others skilled in the art to make and use the same, reference being had to the accompanying drawings, forming part of this specification.

This invention relates to an improved locking-device for the brake-levers of wagon and other brakes.

It consists in an eccentric dog connected to the brake-lever, and to which the brake is connected, working in a circular groove in a metallic sector-plate by the side of the lever, so arranged that it will move freely with the lever, when drawn back to "brake-up," but will bite in the groove, and resist the strain of the brakes when the lever ceases its action on the dog, and also arranged to be disconnected from the said adhesion to the walls of the groove by a backward movement of the lever.

Referring to the accompanying drawings—

A represents a metallic sector-plate, or it may be of segmental or other form, attached to the side of a wagon-box.

It is provided with a circular groove, or recess, B, in its outer face.

C represents the brake-lever, pivoted at the axis of the groove B.

D represents an eccentric dog, fitted to work in the groove B, and provided with an extension, to which the cord or chain leading to the brake is connected.

The said dog is provided with a slot, F, and a pin, G, projecting from the lever, takes into it; and the two are so adjusted, with reference to the "biting"-points, $a\ b$, of the dog, that when the lever is moved in the direction to brake-up, it will disengage the dog from the walls of the groove, and move it readily  As soon as the strain is taken off the lever C, the opposing strain of the brake will cause the dog to "bite" at the points $a\ b$, and hold its position against the said strain.

To disengage the dog and release the brake, the lever is moved in the opposite direction, striking against the face of the projection E, at the point $d$, disconnecting the dog and moving it backward.

I prefer to arrange an outer plate, H, in front of the said apparatus, forming a case for the protection, and I also propose to make the plate B thicker at the top, so as to carry the lever C outward to some extent, as it swings around, to avoid contact with the seat of the wagon.

The apparatus is applicable to any kind of vehicle, and affords a means which can be operated with less labor, and, therefore, more quickly, than any other.

Having thus described my invention,

I claim as new, and desire to secure by Letters Patent—

The combination of the grooved plate A, eccentric dog D, and brake-lever C, when applied to a wagon-brake, substantially as specified.

J. HOKE.

Witnesses:
G. W. DARROW,
E. B. KENDALL.